US011685613B2

(12) United States Patent
Miyahara et al.

(10) Patent No.: US 11,685,613 B2
(45) Date of Patent: Jun. 27, 2023

(54) DIVERTING EQUIPMENT

(71) Applicant: DAIFUKU CO., LTD., Osaka (JP)

(72) Inventors: Akira Miyahara, Shiga (JP); Makoto Namikawa, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/636,933

(22) PCT Filed: Jul. 9, 2020

(86) PCT No.: PCT/JP2020/026802
§ 371 (c)(1),
(2) Date: Feb. 21, 2022

(87) PCT Pub. No.: WO2021/044728
PCT Pub. Date: Mar. 11, 2021

(65) Prior Publication Data
US 2022/0274786 A1 Sep. 1, 2022

(30) Foreign Application Priority Data

Sep. 6, 2019 (JP) .............................. JP2019-162498

(51) Int. Cl.
*B65G 47/68* (2006.01)
*B65G 13/10* (2006.01)
(52) U.S. Cl.
CPC ............. *B65G 47/68* (2013.01); *B65G 13/10* (2013.01)
(58) Field of Classification Search
CPC .................................. B65G 13/10; B65G 47/68
(Continued)

(56) References Cited

U.S. PATENT DOCUMENTS 3,983,988 A * 10/1976 Maxted .................. B65G 47/54
198/782
5,577,596 A * 11/1996 Van Essen ........... B65G 47/648
198/369.5
(Continued)

FOREIGN PATENT DOCUMENTS

JP      H7-291433 A     11/1995
JP      2000-309413 A   11/2000
(Continued)

OTHER PUBLICATIONS

International Search Report from corresponding International Patent Application No. PCT/JP20/26802, dated Aug. 11, 2020.

*Primary Examiner* — Douglas A Hess
(74) *Attorney, Agent, or Firm* — Kusner & Jaffe

(57) ABSTRACT

Diverting equipment that diverts and transports an article on a transporting route to a branching route. The diverting equipment includes: multiple transport rollers that are arranged in a branching section which is on the transporting route and which branches toward the branching route, and that are rotatable about vertical shafts; multiple diverting transport rollers that are arranged at an upstream side end of the branching route and that can rotate about vertical shafts; and a general controller that controls rotation of the transport rollers and of the diverting transport rollers. The transport rollers and the diverting transport rollers divert and transport the article from the transporting route to the branching route by rotating based on a rotational timing that the general controller controls according to a transport speed and an acceleration/deceleration state of the article that is transported toward the branching section.

12 Claims, 5 Drawing Sheets

(58) Field of Classification Search
USPC .............................. 193/36; 198/370.09, 782
See application file for complete search history.

(56) References Cited

U.S. PATENT DOCUMENTS

| | | | |
|---|---|---|---|
| 5,653,325 A * | 8/1997 | Enomoto | B65G 13/10 |
| | | | 198/782 |
| 9,290,333 B2 * | 3/2016 | Skanse | B65G 47/54 |
| 9,309,954 B2 * | 4/2016 | Wilkins | F16H 35/008 |
| 9,499,341 B2 * | 11/2016 | Wilkins | B65G 39/025 |
| 9,676,563 B2 * | 6/2017 | Itoh | B65G 47/46 |
| 9,745,143 B2 * | 8/2017 | Wilkins | B65G 13/10 |
| 10,053,300 B2 * | 8/2018 | Itoh | B65G 15/12 |
| 10,239,274 B2 * | 3/2019 | Sprague | B30B 15/028 |
| 10,543,986 B1 * | 1/2020 | Sines | B65G 13/02 |
| 10,549,917 B2 * | 2/2020 | Garehan | B65G 13/10 |
| 11,008,175 B1 * | 5/2021 | Watts | F16M 13/02 |
| 11,319,156 B2 * | 5/2022 | Sun | B65G 13/10 |
| 11,352,215 B2 * | 6/2022 | Huang | B65G 13/10 |

FOREIGN PATENT DOCUMENTS

| | | |
|---|---|---|
| JP | 2008-30860 A | 2/2008 |
| JP | 2009-298573 A | 12/2009 |

\* cited by examiner

DIVERTING EQUIPMENT

FIELD OF THE INVENTION

The present invention relates to diverting equipment capable of transporting a transported object on a transporting route to a branching route that branches from the transporting route.

BACKGROUND OF THE INVENTION

Equipment disclosed in Japanese Patent Laid Open No. 2008-30860 and Japanese Patent Laid Open No. 2009-298573 is available as diverting equipment that is capable of transporting a transported object on a transporting route to a branching route which branches from the transporting route.

In diverting equipment disclosed in Japanese Patent Laid Open No. 2008-30860, a branching route that branches at a right angle to the transporting route is formed at the side of a predetermined location in the transporting route. At the predetermined location, a plurality of transport rollers forming a transporting surface are arranged in the direction of the transporting route and in a lateral direction with respect to the transporting route, respectively. Each of the transport rollers arranged at the predetermined location is configured so as to be turnable about a vertical shaft. The transport rollers are turned at right angles in the direction of the transport path and in the lateral direction thereto by a turning device. The transport rollers are operatively connected by a rotary driving device. The rotary driving device stops driving when the transported object on the transporting route is located at the predetermined location. Further, the rotary driving device drives after the turning device causes the transport rollers in the direction of the transporting route to turn to the lateral direction.

On the other hand, sorting equipment disclosed in Japanese Patent Laid Open No. 2009-298573 includes a main transporting path for transporting articles, a branch transporting path that is connected to a side section of the main transporting path, and a sorting device arranged at a branching section with the branch transporting path in the main transporting path. The sorting device provided in the aforementioned sorting equipment includes a plurality of delivery rollers which are drivingly rotatable and which are rollers that are arranged at predetermined intervals in each of the transporting direction and the width direction of the main transport path. When sending an article which has been transported from the upstream side in the transporting direction of the main transporting path to the branch transporting path, the delivery rollers protrude from the transporting surface of the main transporting path to face toward the branch transporting path. In the sorting equipment disclosed in Japanese Patent Laid Open No. 2009-298573, the delivery roller which is furthest on the upstream side in the transporting direction of the main transporting path among the plurality of delivery rollers is arranged on the upstream side in the transporting direction at the branching section of the main transporting path, and the delivery roller that is furthest on the downstream side in the transporting direction of the main transporting path and furthest on the branch transporting path side thereof is arranged on an extension line of the center line of the branch transporting path, and therefore even in the case of sending a large article having a width dimension that is about the same as the width of the branch transporting path to the branch transporting path, the delivery rollers which finally send out the article to the branch transporting path can push the article from a position that is approximately directly behind the center of gravity of the article.

However, in the diverting equipment as disclosed in Japanese Patent Laid Open No. 2008-30860, when a transported object on the transporting route is being diverted and transported to the branching route, it is necessary to temporarily stop the transported object at the branching section of the transporting route, and therefore there is a problem that the efficiency of transporting the transported object deteriorates.

Further, in the diverting equipment as disclosed in Japanese Patent Laid Open No. 2009-298573, when a transported object on the transporting route is being diverted and transported to the branching route, although it is not necessary to temporarily stop the transported object at the branching section of the transporting route, there is a problem that the transporting direction of the transported object cannot be abruptly (in the right-angle direction) changed, and furthermore, the transported object cannot be parallelly diverted and transported without changing the posture of the transported object.

SUMMARY OF THE INVENTION

It is an object of the present invention to provide diverting equipment which, when diverting and transporting a transported object on a transporting route to a branching route, can efficiently transport the transported object without temporarily stopping the transported object at a branching section of the transporting route.

A problem to be solved by the present invention is as described above. Next, means for solving the problem will be described.

That is, diverting equipment of the present invention is diverting equipment that diverts and transports a transported object on a transporting route to a branching route that branches at a right angle with respect to the transporting route, including: a plurality of transport rollers which are arranged in a branching section to the branching route on the transporting route, and which form a transporting surface of the transporting route and which are each rotatable about a vertical shaft; a plurality of diverting transport rollers which are arranged at an upstream side end of the branching route, and which form a transporting surface of the branching route and which are each rotatable about a vertical shaft; and a control device that controls rotation of the transport rollers and the diverting transport rollers; wherein: the control device controls a rotational timing of the transport rollers and of the diverting transport rollers according to a transport speed and an acceleration/deceleration state of the transported object that is transported toward the branching section and causes the transported object to be diverted and transported from the transporting route to the branching route.

Here, the phrase "acceleration/deceleration state of the transported object" refers to any state among a state in which the transported object is being accelerated and transported, a state in which the transported object is being decelerated and transported, and a state in which the transported object is being transported at a constant speed. Further, the term "right angle" refers to an angle of 90 degrees, including a predetermined allowable error.

In the above configuration, the rotational timing of the transport rollers and of the diverting transport rollers is controlled according to the transport speed and acceleration/ deceleration state of the transported object that is transported toward the branching section.

Another aspect of the diverting equipment of the present invention is in accordance with the diverting equipment described above, and includes a sensor which is provided in the transporting route on an upstream side relative to the branching section and which detects the transported object that is transported toward the branching section, wherein the control device: predicts a transport speed and an acceleration/deceleration state of the transported object when the transported object is transported to a predetermined location in the branching section, based on a transport speed and an acceleration/deceleration state of the transported object detected by the sensor, and controls a rotational timing of the transport rollers and of the diverting transport rollers based on a transport speed and an acceleration/deceleration state of the transported object that are predicted.

In the above configuration, the rotational timing of the transport rollers and the diverting transport rollers is controlled based on a transport speed and an acceleration/deceleration state of the transported object that is transported to a predetermined location in the branching section which are predicted based on the transport speed and the acceleration/deceleration state of the transported object detected by the sensor.

Another aspect of the diverting equipment of the present invention is in accordance with the diverting equipment described above, wherein the control device individually controls a rotational timing of the transport rollers and a rotational timing of the diverting transport rollers.

In the above configuration, the transport rollers and the diverting transport rollers rotate at individual timings.

Another aspect of the diverting equipment of the present invention is in accordance with the diverting equipment described above, wherein: a plurality of transport rollers arranged in a direction of the transporting route and a lateral direction with respect to the transporting route, respectively, in the branching section are grouped for each predetermined number of transport rollers in the direction of the transporting route to form a plurality of transport roller units; and the control device controls a rotational timing of the transport rollers for each of the transport roller units.

In the above configuration, the transport rollers rotate at individual timings for each of a plurality of transport roller units formed in the branching section.

Another aspect of the diverting equipment of the present invention is in accordance with the diverting equipment described above, wherein the control device controls a rotational timing of the transport rollers for each of the transport roller units which the transported object passed.

In the above configuration, in each of the transport roller units which the transported object passes, the transport rollers rotate.

According to the diverting equipment of the present invention, because the rotational timing of the transport rollers and the diverting transport rollers is controlled according to the transport speed and the acceleration/deceleration state of a transported object that is transported toward a branching section, the transported object is divertible and transportable to a branching route that branches at a right angle from a transporting route, without temporarily stopping the transported object at the branching section.

DETAILED DESCRIPTION OF THE INVENTION

Hereunder, diverting equipment 10 according to an embodiment of the present invention is described. Note that the present invention is not limited to the diverting equipment 10 described hereunder.

Figure 1:
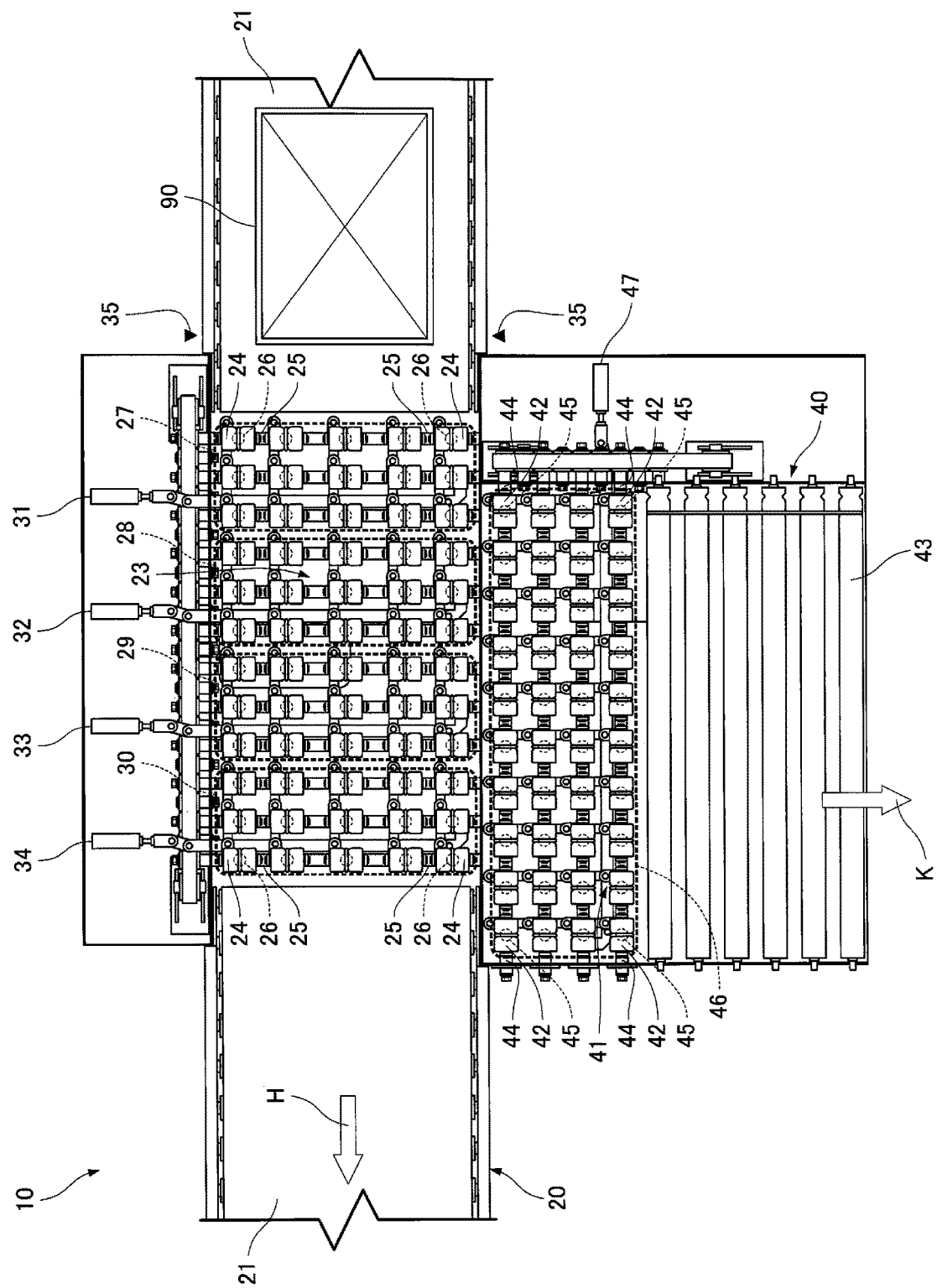
FIG. 1 is a schematic plan view of diverting equipment according to the present invention.
Figure 2:
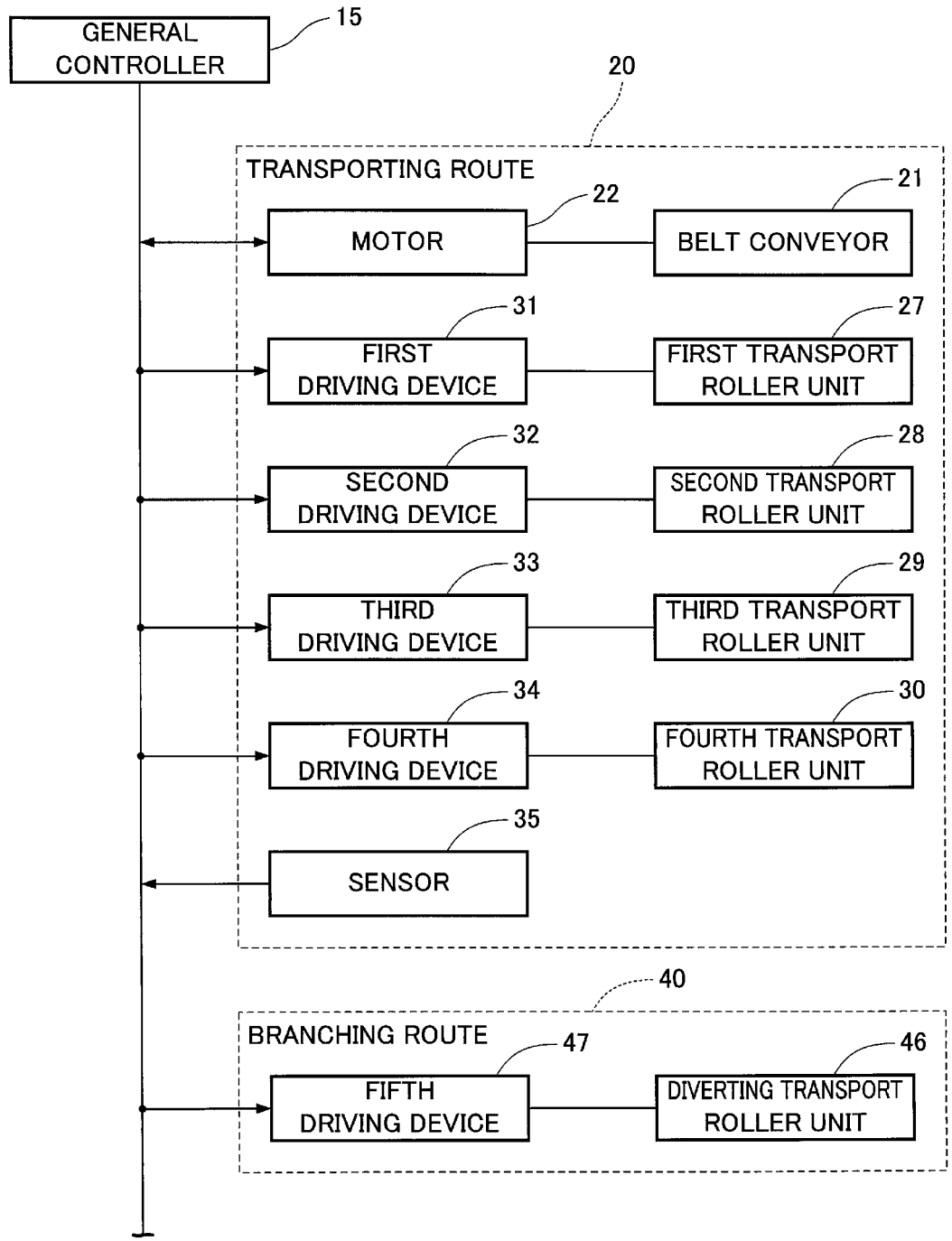
FIG. 2 is a block diagram illustrating a control configuration of the diverting equipment according to the present invention.

As illustrated in FIG. 1 and FIG. 2, the diverting equipment 10 is mainly constituted by a transporting route 20 that transports articles 90 (one example of a "transported object"), a branching route 40 which branches at a right angle with respect to the transporting route 20, and a general controller 15 (one example of a "control device") which performs control of the entire diverting equipment 10. In the diverting equipment 10, the articles 90 that have been transported from the upstream side in the transporting direction of the transporting route 20 are, as necessary, sorted so as to be transported to the downstream side in the transporting direction of the transporting route 20 or to the branching route 40.

The transporting route 20 is the principal transporting route for transporting the articles 90. The transporting route 20 is constituted by a belt conveyor 21. Note that the transporting route 20 is not limited to the belt conveyor 21, and for example may be constituted by a driving-type roller conveyor. The belt conveyor 21 is driven by a motor 22 that is controlled by the general controller 15.

A branching section 23 for diverting and transporting an article 90 that has been transported from the upstream side in the transporting direction of the transporting route 20 to the branching route 40 is provided on the transporting route 20. The branching section 23 is a branching portion to the branching route 40 on the transporting route 20. An upstream side end 41 of the branching route 40 is connected to a side section of the branching section 23.

A plurality of transport rollers 24 are arranged in the branching section 23. The roller surfaces of the transport rollers 24 form the transporting surface of the transporting route 20. Each transport roller 24 is revolvably supported with respect to a horizontal roller shaft 25 arranged in a direction which is horizontally perpendicular to a transporting direction H of the transporting route 20. Each transport roller 24 is supported together with the horizontal roller shaft 25 by a vertical shaft 26 arranged in a direction which is perpendicular in the vertical direction to the transporting direction H of the transporting route 20. Each transport roller 24 is provided to be rotatable about the vertical shaft 26. By rotating about the respective vertical shafts 26, the transport rollers 24 rotate horizontally at a predetermined angle with respect to the transporting direction H of the transporting route 20, and change the transporting direction of the article 90.

In the branching section 23, a plurality of the transport rollers 24 are aligned and arranged along each of the direction of the transporting route 20 (the transporting direction H of the transporting route 20) and a lateral direction to the transporting route 20 (direction that is horizontally orthogonal to the transporting direction H of the transporting route 20). The transport rollers 24 are grouped for each predetermined number of the transport rollers 24 arranged along the direction of the transporting route 20, and transport roller units 27, 28, 29 and 30 are formed by each of the grouped transport rollers 24. Driving of the transport rollers 24 is controlled for each of the transport roller units 27, 28, 29 and 30. The transport rollers 24 are connected to driving devices 31, 32, 33 and 34 which are provided for the transport roller units 27, 28, 29 and 30, respectively. Revolving of the transport rollers 24 by means of the horizontal roller shafts 25 and rotation of the transport rollers 24 by means of the vertical shafts 26 are performed by driving of the driving devices 31, 32, 33 and 34. The driving devices 31, 32, 33 and 34 are constituted by a motor or the like. The driving devices 31, 32, 33 and 34 are connected to the general controller 15. Driving of the driving devices 31, 32, 33 and 34 is controlled by the general controller 15. That is, revolving of the transport rollers 24 by means of the horizontal roller shafts 25 and rotation of the transport rollers 24 by means of the vertical shafts 26 are controlled by the general controller 15.

A sensor 35 that detects the article 90 is provided in the transporting route 20. Specifically, the sensor 35 is provided at the side of the transporting route 20 at a position on the upstream side relative to the branching section 23. The sensor 35 detects the article 90 that is transported toward the branching section 23 from the upstream side in the transporting direction of the transporting route 20. That is, the sensor 35 detects the presence or absence of an article 90 that is about to enter the branching section 23. The sensor 35 is connected to the general controller 15. The sensor 35 sends a detection signal to the general controller 15.

The branching route 40 is a transporting route that branches at a right angle with respect to the transporting route 20 from the branching section 23 on the transporting route 20. Here, the term "right angle" refers to an angle of 90 degrees, including a predetermined allowable error. The upstream side end 41 of the branching route 40 is connected to one side (in FIG. 1, the left side with respect to the transporting direction H of the transporting route 20) in the branching section 23 of the transporting route 20. The upstream side end 41 of the branching route 40 is constituted by a plurality of diverting transport rollers 42. The other portions of the branching route 40 are mainly constituted by a roller conveyor 43.

The roller surfaces of the diverting transport rollers 42 form the transporting surface of the branching route 40. Each diverting transport roller 42 is revolvably supported with respect to a horizontal roller shaft 44 arranged in a direction which is horizontally perpendicular to a transporting direction K of the branching route 40. Each diverting transport roller 42 is supported together with the horizontal roller shaft 44 by a vertical shaft 45 arranged in a direction which is perpendicular in the vertical direction with respect to the transporting direction K of the branching route 40. Each diverting transport roller 42 is provided to be rotatable about the vertical shaft 45. By rotating about the respective vertical shafts 45, the diverting transport rollers 42 rotate horizontally at a predetermined angle with respect to the transporting direction K of the branching route 40, and guide the article 90 that is transported thereto from the transporting route 20 to the downstream side in the transporting direction of the branching route 40. At the upstream side end 41 of the branching route 40, the diverting transport rollers 42 form a diverting transport roller unit 46 by being aligned and arranged in plurality along each of the direction of the branching route 40 (the transporting direction K of the branching route 40) and a lateral direction to the branching route 40 (a direction that is horizontally orthogonal to the transporting direction K of the branching route 40). The diverting transport rollers 42 are connected, as the entire diverting transport roller unit 46, to a fifth driving device 47. Revolving of the diverting transport rollers 42 by means of the horizontal roller shafts 44 and rotation of the diverting transport rollers 42 by means of the vertical shafts 45 are performed by driving of the fifth driving device 47. The fifth driving device 47 is constituted by a motor or the like. The fifth driving device 47 is connected to the general controller 15. Driving of the fifth driving device 47 is controlled by the general controller 15. That is, revolving of the diverting transport rollers 42 by means of the horizontal roller shafts 44 and rotation of the diverting transport rollers 42 by means of the vertical shafts 45 are controlled by the general controller 15.

As illustrated in FIG. 2, the general controller 15 is connected to the driving devices 31, 32, 33 and 34 that control the transport roller units 27, 28, 29 and 30, and the fifth driving device 47 that controls the diverting transport roller unit 46. The general controller 15 controls the driving devices 31, 32, 33, 34 and 47. The general controller 15 is connected to the motor 22 that drives the belt conveyor 21 of the transporting route 20. The general controller 15 controls the motor 22 and also receives a driving signal from the motor 22. The general controller 15 is connected to the sensor 35. The general controller 15 receives a detection signal from the sensor 35.

Next, operation of the transport rollers 24 and the diverting transport rollers 42 will be described.

Figure 3A:
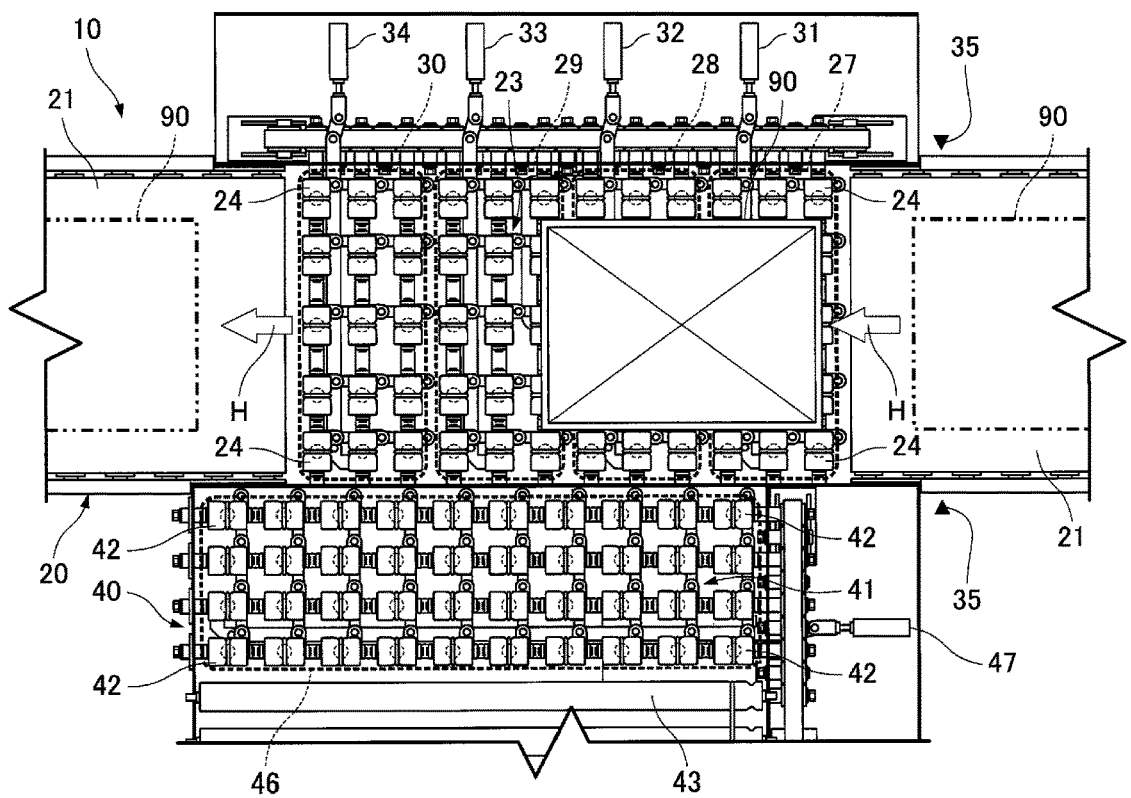
FIG. 3A is a schematic plan view of the diverting equipment according to the present invention in a case where articles are transported on a transporting route.
Figure 3B:
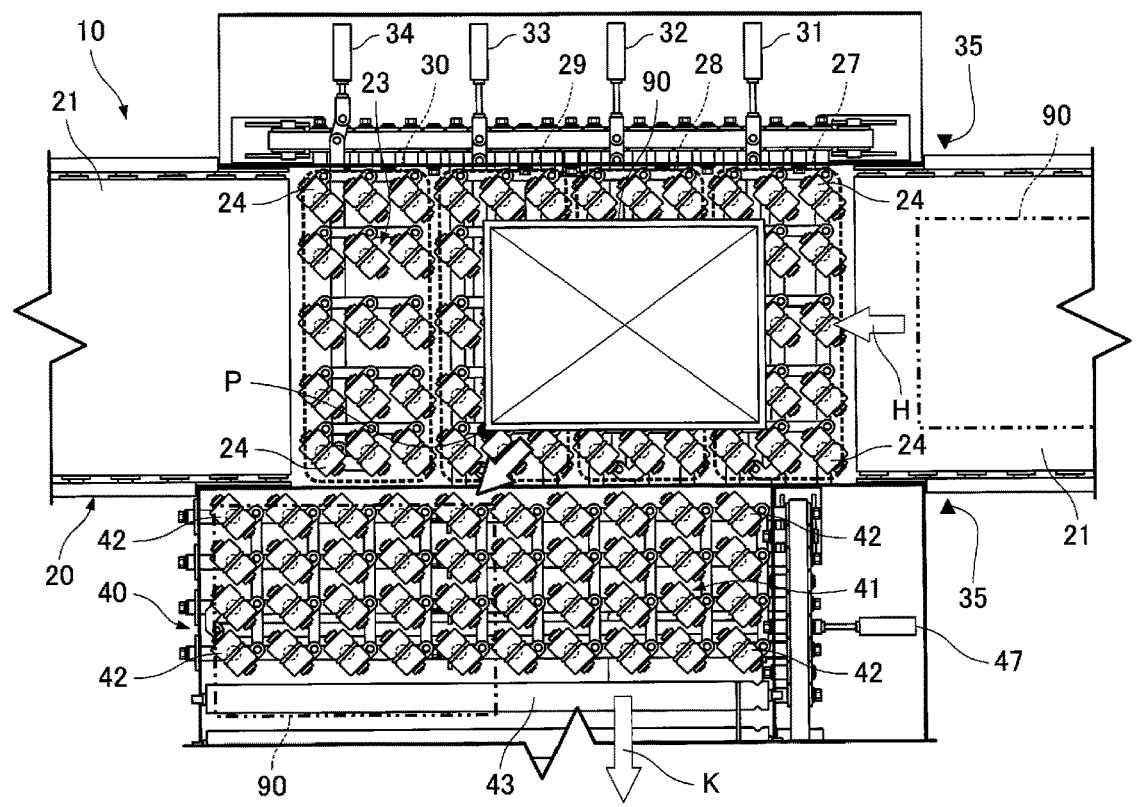
FIG. 3B is a schematic plan view of the diverting equipment according to the present invention in a case where an article is diverted and transported from the transporting route to a branching route.

As illustrated in FIG. 3A and FIG. 3B, in the diverting equipment 10 the transport rollers 24 are arranged so that the roller surfaces thereof are in the same direction as the transporting direction H of the transporting route 20. Similarly, the diverting transport rollers 42 are arranged so that the roller surfaces thereof are in the same direction as the transporting direction K of the branching route 40. As illustrated in FIG. 3A, in a case where the article 90 that is being transported from the upstream side in the transporting direction of the transporting route 20 is to be transported to the downstream side in the transporting direction of the transporting route 20 along the transporting direction H of the transporting route 20, the roller surfaces of the transport rollers 24 and the diverting transport rollers 42 are maintained without rotating.

On the other hand, as illustrated in FIG. 3B, in a case where the article 90 that has been transported from the upstream side in the transporting direction of the transporting route 20 is to be diverted and transported to the branching route 40 through the branching section 23, the roller surfaces of the transport rollers 24 are rotated at a predetermined angle with respect to the branching section 23 by the driving devices 31, 32, 33 and 34. Similarly, the roller surfaces of the diverting transport rollers 42 are rotated at a predetermined angle with respect to the branching route 40 by the fifth driving device 47. Specifically, the driving devices 31, 32, 33 and 34 rotate the vertical shafts 26 so that the roller surfaces of the transport rollers 24 incline at an angle of 45 degrees to the branching route 40 side relative to the transporting direction H of the transporting route 20. Similarly, the fifth driving device 47 rotates the vertical shafts 45 so that the roller surfaces of the diverting transport rollers 42 incline at an angle of 45 degrees to the transporting route 20 relative to the transporting direction K of the branching route 40.

Next, control of the operations of the transport rollers 24 and the diverting transport rollers 42 will be described.

As illustrated in FIG. 1 and FIG. 2, with regard to the transport rollers 24, revolving by means of the horizontal roller shafts 25 (hereinafter, referred to as "revolving of the transport rollers 24") and rotation by means of the vertical shafts 26 (hereinafter, referred to as "rotation of the transport rollers 24") are controlled by the general controller 15. Similarly, with regard to the diverting transport rollers 42, revolving by means of the horizontal roller shafts 44 (hereinafter, referred to as "revolving of the diverting transport rollers 42") and rotation by means of the vertical shafts 45 (hereinafter, referred to as "rotation of the diverting transport rollers 42") are controlled by the general controller 15. Specifically, revolving and rotation of the transport rollers 24 and revolving and rotation of the diverting transport rollers 42 are controlled by the general controller 15 controlling driving of the driving devices 31, 32, 33, 34, and 47.

The general controller 15 controls revolving and rotation of the transport rollers 24 and revolving and rotation of the diverting transport rollers 42 according to the transport status of the article 90 in the transporting route 20 and the branching route 40. For example, in a case where the article 90 is stagnant on the downstream side in the transporting direction of the transporting route 20, the general controller 15 stops the revolving of the transport rollers 24. Further, in a case where the article 90 is stagnant on the downstream side in the transporting direction of the branching route 40, the general controller 15 stops the revolving of the diverting transport rollers 42. In addition, in the case of diverting and transporting the article 90 from the transporting route 20 to the branching route 40, the general controller 15 causes the transport rollers 24 and the diverting transport rollers 42 to rotate.

In the diverting equipment 10, normally, the article 90 is transported with the transporting route 20 at a constant transport speed in accordance with the transport capacity of the belt conveyor 21 of the transporting route 20. Further, when the article 90 is to be diverted and transported to the branching route 40 from the transporting route 20 also, the article 90 enters the branching section 23 at the same speed as the transport speed at which the article 90 is transported on the transporting route 20, and is transported toward the branching route 40.

On the other hand, in the diverting equipment 10, because the article 90 is stopped depending on the transport status of the article 90 in the transporting route 20 and the branching route 40, when diverting and transporting the article 90 from the transporting route 20 to the branching route 40, the article 90 will enter the branching section 23 while accelerating or the article 90 will enter the branching section 23 while decelerating. Therefore, the general controller 15 performs control of rotation of the transport rollers 24 and the diverting transport rollers 42 according to the transport speed and acceleration/deceleration state of the article 90 that is transported from the upstream side in the transporting direction of the transporting route 20. Here, the phrase "acceleration/deceleration state of the article 90" refers to any state among a state in which the article 90 is being transported while accelerating, a state in which the article 90 is being transported while decelerating, and a state in which the article 90 is being transported at a constant speed.

Specifically, first, based on a detection signal that is sent from the sensor 35, the general controller 15 calculates the transport speed and acceleration/deceleration state of the article 90 at the time that the article 90 passes the sensor 35. More specifically, upon receiving the detection signal from the sensor 35, the general controller 15 determines whether or not a driving signal of the motor 22 of the belt conveyor 21 of the transporting route 20 is ON. If the general controller 15 determines that the driving signal of the motor 22 is ON, the general controller 15 calculates the time period from when the driving signal of the motor 22 was turned ON until the article 90 passed the sensor 35, and determines whether or not the calculated time period exceeds a certain time period (set acceleration time). If the general controller 15 determines that the aforementioned calculated time period exceeds the certain time period, the general controller 15 determines that the state is one in which the article 90 is being transported at a constant speed. Further, if the general controller 15 determines that the aforementioned calculated time period does not pass exceed the certain time period, the general controller 15 determines that the state is one in which the article 90 is being transported while accelerating. On the other hand, if the general controller 15 determines that the driving signal of the motor 22 is OFF, the general controller 15 determines that the state is one in which the article 90 is being transported while decelerating.

Further, at the same time, upon receiving a detection signal from the sensor 35, the general controller 15 calculates the transport speed of the article 90 at the time that the article 90 passed the sensor 35, based on the transport speed of the belt conveyor 21 at the time that the article 90 passed the sensor 35.

In addition, based on the transport speed and acceleration/deceleration state of the article 90 at the time of passing the sensor 35 calculated as described above, the general controller 15 predicts the transport speed and acceleration/deceleration state of the article 90 at the time that the article 90 arrives at a branching point P of the branching section 23, and also predicts the timing at which the downstream end of the article 90 (front-side end in the transporting direction of the article 90) will pass the branching point P. That is, taking the timing at which the sensor 35 detected the article 90 as the starting point, the general controller 15 predicts the subsequent position of the article 90. Here, the term "branching point P" refers to the position on the branching section 23 at which the article 90 that is transported at a constant speed according to the transport capacity of the belt conveyor 21 starts to skew toward the branching route 40 when the article 90 is diverted and transported from the transporting route 20 to the branching route 40. The branching point P is set according to the size of the article 90 and the transport capacity of the belt conveyor 21 (transport speed of the article 90). By starting to skew at the branching point P, the article 90 that is transported at a constant speed according to the transport capacity of the belt conveyor 21 is transported to the branching route 40 with a parallelly stabilized branching trajectory while maintaining the transport speed and posture thereof. Note that, a determination as to when the article 90 reaches the branching point P is not limited to a determination that is made based on the front-side end in the transporting direction of the article 90 (downstream side end in the transporting direction of the article 90), and may be a determination that is made based on the rear-side end in the transporting direction of the article 90 (upstream side end in the transporting direction of the article 90) or the center of the article 90.

The general controller 15 controls the timing (rotational timing) at which to cause the transport rollers 24 and the diverting transport rollers 42 to rotate based on the predicted transport speed and acceleration/deceleration state of the article 90 at the branching point P, and the timing at which the downstream end of the article 90 passes the branching point P. Specifically, if the general controller 15 predicts that the article 90 will be transported at a constant speed to the branching point P, the general controller 15 rotates the transport rollers 24 and the diverting transport rollers 42 at the timing at which the front-side end in the transporting direction of the article 90 passes the branching point P.

Further, if the general controller 15 predicts that the article 90 will pass the branching point P while accelerating, or predicts that the article 90 will pass the branching point P while decelerating, the general controller 15 rotates the transport rollers 24 and the diverting transport rollers 42 after a predetermined time period elapses from the time at which the front-side end in the transporting direction of the article 90 passes the branching point P. That is, if the general controller 15 predicts that the article 90 will pass the branching point P at a lower speed than the constant speed, the general controller 15 rotates the transport rollers 24 and the diverting transport rollers 42 at a timing at which the front-side end in the transporting direction of the article 90 passes a position further on the downstream side in the transporting direction than the branching point P. Here, the predetermined time period is a time period that is set based on the transport speed of the article 90 when the article 90 is transported at a constant speed. The predetermined time period is set according to the speed ratio between the transport speed of the article 90 when the article 90 is transported at a constant speed and the transport speed of the article 90 when the article 90 passes the branching point P. That is, if the transport speed of the article 90 when the article 90 is transported at a constant speed and the transport speed of the article 90 when the article 90 passes the branching point P are the same speed, the aforementioned predetermined time period will be zero. Further, the slower the transport speed of the article 90 when the article 90 passes the branching point P is compared to the transport speed of the article 90 when the article 90 is transported at a constant speed, the longer the predetermined time period will be.

In a case where the article 90 passes the branching point P while accelerating or a case where the article 90 passes the branching point P while decelerating, the transport speed of the article 90 will be slower than the transport speed in a case where the article 90 passes the branching point P at a constant speed. Therefore, if the transport rollers 24 and the diverting transport rollers 42 are caused to rotate at the timing at which the article 90 passes the branching point P, the article 90 cannot be transported with a branching trajectory that is equivalent to the branching trajectory in a case where the article 90 is transported at a constant speed, and the article 90 cannot be transported to the branching route 40 with a parallelly stabilized branching trajectory while maintaining the posture of the article 90. Therefore, in a case where the article 90 passes the branching point P while accelerating or a case where the article 90 passes the branching point P while decelerating, by retarding the rotational timing of the transport rollers 24 and the diverting transport rollers 42 relative to a case where the article 90 passes the branching point P at a constant speed, the article 90 is transported with a branching trajectory that is equivalent to the branching trajectory in a case where the article 90 is transported at a constant speed.

The general controller 15 individually controls the rotational timing of the transport rollers 24 and the rotational timing of the diverting transport rollers 42. Specifically, as illustrated in FIG. 4A, FIG. 4B, FIG. 5A and FIG. 5B, in a case where the article 90 has been transported to the branching point P at a constant speed, the general controller 15 rotates the transport rollers 24 at the diverting transport rollers 42 at a predetermined angle at the timing at which the front-side end in the transporting direction of the article 90 passes the branching point P. Next, at a timing at which the article 90 has passed the branching section 23 of the transporting route 20 and has been transported to the branching route 40, the general controller 15 rotates only the transport rollers 24 to the initial position thereof while maintaining the diverting transport rollers 42 at the predetermined angle. Finally, at a timing at which the article 90 passes the upstream side in the transporting direction of the branching route 40, the general controller 15 rotates the diverting transport rollers 42 to the initial position thereof.

Figure 4A:
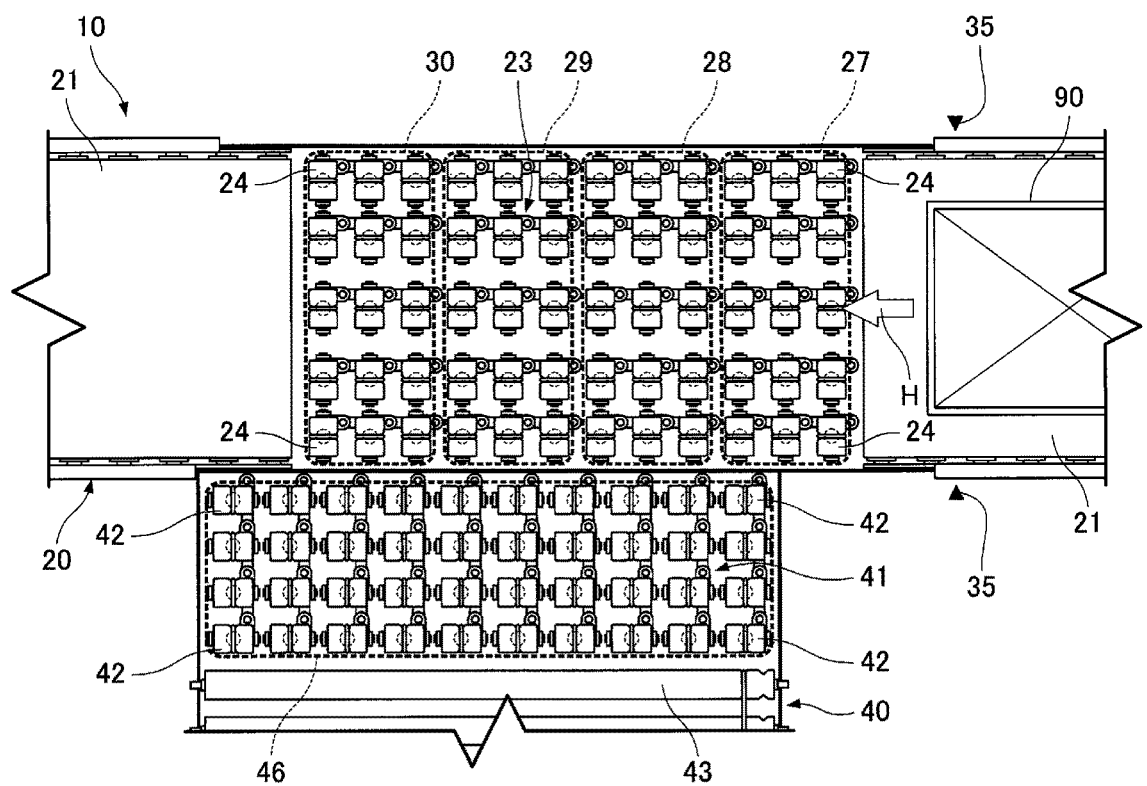
FIG. 4A is a schematic plan view illustrating, in the diverting equipment according to the present invention, an operating state of transport rollers and diverting transport rollers before an article is transported to a branching section.
Figure 4B:
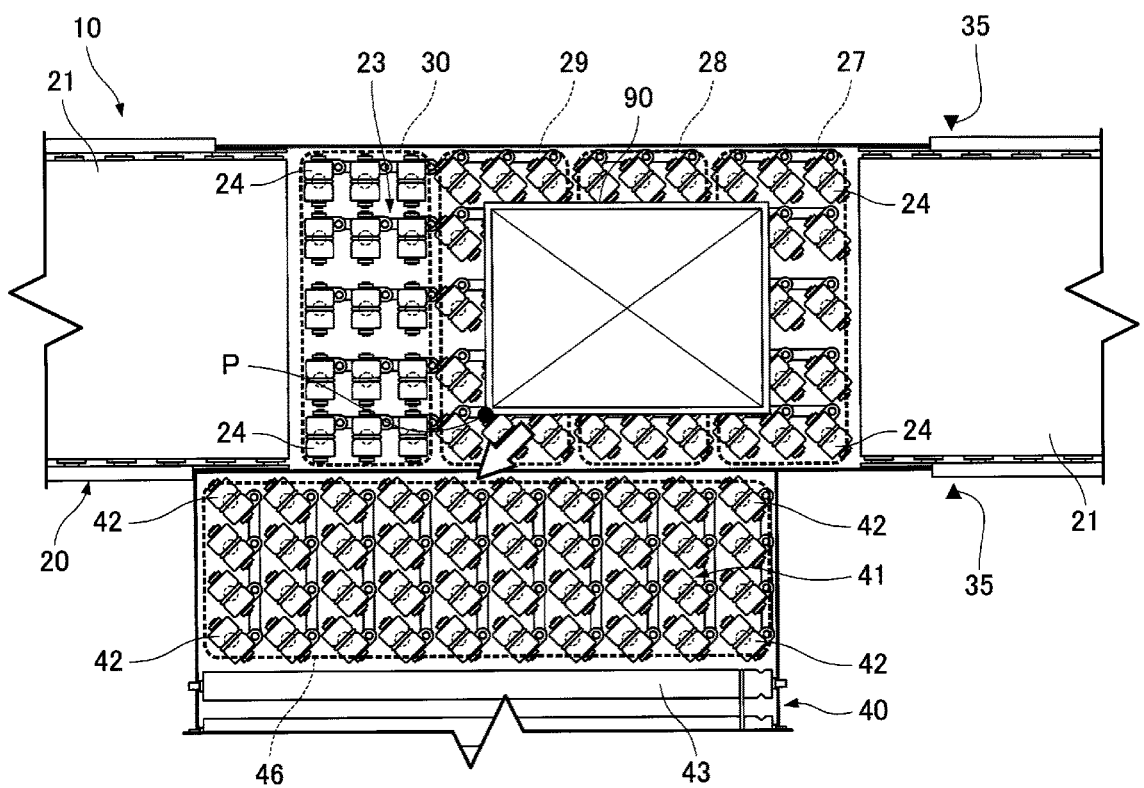
FIG. 4B is a schematic plan view illustrating, in the diverting equipment according to the present invention, an operating state of transport rollers and diverting transport rollers during a process in which an article is being transported to the branching section.
Figure 5A:
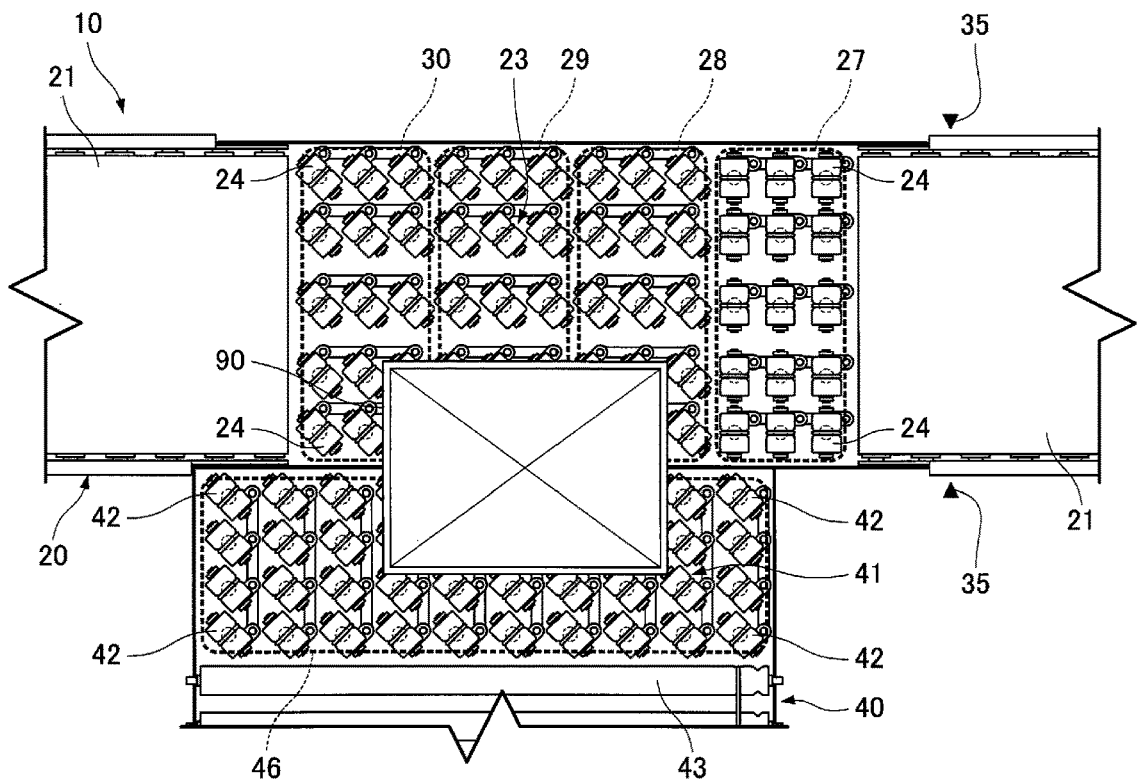
FIG. 5A is a schematic plan view illustrating, in the diverting equipment according to the present invention, an operating state of transport rollers and diverting transport rollers during a process in which an article is being transported from the branching section to the branching route.

Further, the general controller 15 controls the rotational timing of the transport rollers 24 for each of the transport roller units 27, 28, 29 and 30. That is, the transport roller units 27, 28, 29 and 30 are divided into four units, and each of the transport roller units 27, 28, 29 and 30 perform diverting operations independently. Specifically, as illustrated in FIG. 4B, in a case where the article 90 has been transported to the branching point P at a constant speed, the general controller 15 rotates the transport rollers 24 of the transport roller units 27, 28 and 29 at a predetermined angle at a timing at which the front-side end in the transporting direction of the article 90 passes the branching point P. Next, as illustrated in FIG. 5A, at a timing at which the article 90 runs onto the transport rollers 24 of the fourth transport roller unit 30, the general controller 15 rotates the transport rollers 24 of the fourth transport roller unit 30 at a predetermined angle. By controlling the rotational timing of the transport rollers 24 for each of the transport roller units 27, 28, 29 and 30 in this way, the transport rollers 24 is rotatable and a diverting operation can be started after the article 90 has arrived, and a transporting force in an oblique direction is appliable across the whole of the article 90. Further, parallel diversion of the article 90 is performable with stable behavior that is tailored to the size of the article 90.

Figure 5B:
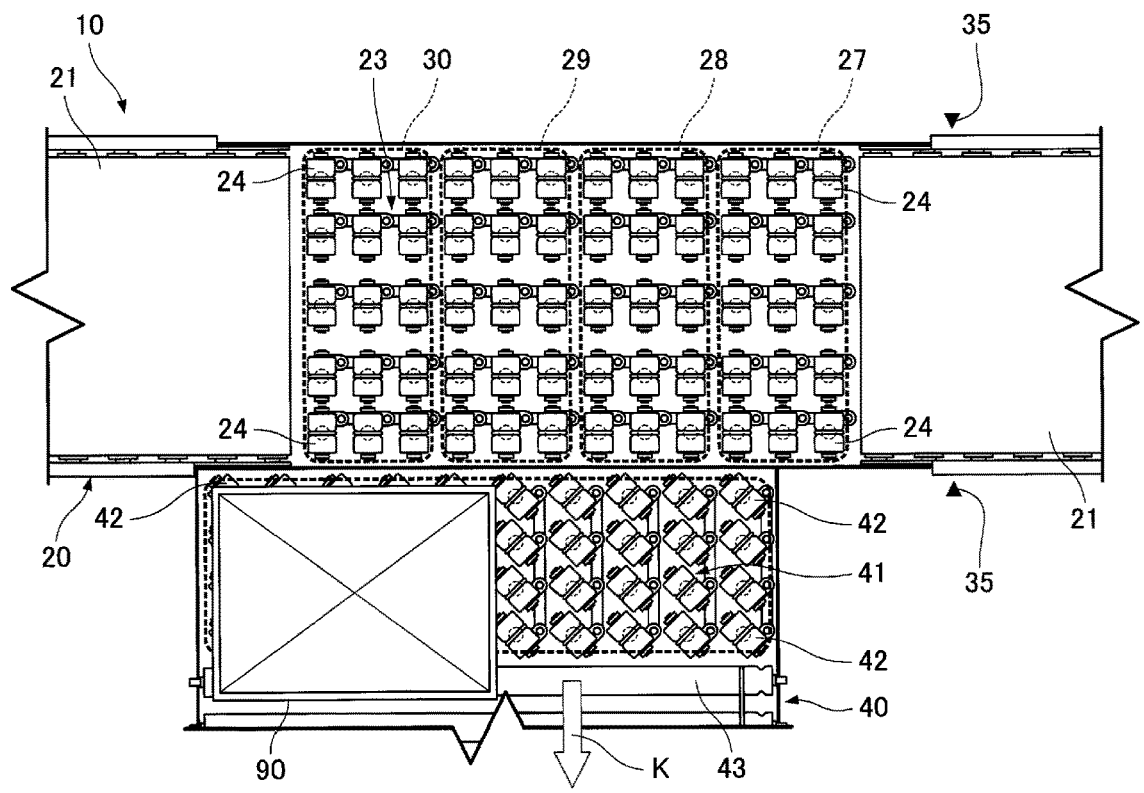
FIG. 5B is a schematic plan view illustrating, in the diverting equipment according to the present invention, an operating state of transport rollers and diverting transport rollers when an article has been transported to the branching route.

In addition, the general controller 15 controls the rotational timing of the transport rollers 24 for each of the transport roller units 27, 28, 29 and 30 that the article 90 has passed. Specifically, as illustrated in FIG. 5A, as the article 90 is diverted and transported from the upstream side in the transporting direction of the transporting route 20 to the branching route 40, the general controller 15 rotates the transport rollers 24 to the initial position thereof for each of the transport roller units 27, 28, 29 and 30 in order from the first transport roller unit 27 on the upstream side in the transporting direction at a timing at which the article 90 has passed. As illustrated in FIG. 5B, when the article 90 has been transported to the branching route 40, the general controller 15 rotates the transport rollers 24 of all of the transport roller units 27, 28, 29 and 30 to the initial position. By controlling the rotational timing of the transport rollers 24 for each of the transport roller units 27, 28, 29 and 30 which the article 90 passed in this way, the transport roller units 27, 28, 29 and 30 which the article 90 has passed can accept a subsequent article 90.

As described above, according to the present embodiment, since the rotational timing of the transport rollers 24 and the diverting transport rollers 42 is controlled according to the transport speed and acceleration/deceleration state of the article 90 that is transported toward the branching section 23, the article 90 is divertible and transportable to the branching route 40 that branches at a right angle from the transporting route 20, without temporarily stopping the branching section 23.

Note that, although in the present embodiment the revolving and rotation of the transport rollers 24 and the diverting transport rollers 42 are controlled by the general controller 15 that controls the entire diverting equipment 10, the present invention is not limited thereto, and a configuration may be adopted in which the revolving and rotation are controlled by a lower order controller than the general controller 15.

Although in the present embodiment the branching route 40 is formed on one side of the transporting route 20 (left side in the transporting direction H of the transporting route 20), the present invention is not limited thereto, and a configuration may be adopted in which the branching route 40 is formed on both sides of the transporting route 20. Further, the branching route 40 may be formed orthogonally with respect to the transporting route 20.

In the present embodiment, although a predetermined number of the transport rollers 24 are grouped into four transport roller units 27, 28, 29 and 30, the number of transport roller units and the number of the transport rollers 24 that are grouped into each of the transport roller units are not limited to the numbers in the present embodiment.

Although in the present embodiment the four transport roller units 27, 28, 29 and 30 are controlled by the four driving devices 31, 32, 33 and 34, the present invention is not limited thereto, and a configuration may be adopted in which the four transport roller units 27, 28, 29 and 30 are controlled by one driving device.

Although in the present embodiment the sensor 35 is a sensor that detects the article 90 which is transported toward the branching section 23 from the upstream side in the transporting direction of the transporting route 20, the present invention is not limited thereto, and the sensor 35 may be a sensor which has a function for detecting the article 90 and also has a function for detecting the transport speed of the article 90.

REFERENCE SIGNS LIST

10 Diverting equipment
15 General Controller (Control Device)
20 Transporting Route
23 Branching Section
24 Transport Roller
26 Vertical Shaft
27 First Transport Roller Unit (Transport Roller Unit)
28 Second Transport Roller Unit (Transport Roller Unit)
29 Third Transport Roller Unit (Transport Roller Unit)
30 Fourth Transport Roller Unit (Transport Roller Unit)
35 Sensor
40 Branching Route
41 Upstream End of Branching Route
42 Diverting transport roller
45 Vertical Shaft
90 Article (Transported Object)

What is claimed is:

1. Diverting equipment that diverts and transports a transported object on a transporting route to a branching route that branches at a right angle with respect to the transporting route, comprising:
a plurality of transport rollers which are arranged in a branching section to the branching route on the transporting route, and which form a transporting surface of the transporting route and which are each rotatable about a vertical shaft;
a plurality of diverting transport rollers which are arranged at an upstream side end of the branching route, and which form a transporting surface of the branching route and which are each rotatable about a vertical shaft; and
a control device that controls rotation of the transport rollers and the diverting transport rollers;
wherein:
the control device controls a rotational timing of the transport rollers and of the diverting transport rollers according to a transport speed and an acceleration/deceleration state of the transported object that is transported toward the branching section and causes the transported object to be diverted and transported from the transporting route to the branching route.

2. The diverting equipment according to claim 1, comprising:
a sensor which is provided in the transporting route on an upstream side relative to the branching section and which detects the transported object that is transported toward the branching section,
wherein the control device:
predicts a transport speed and an acceleration/deceleration state of the transported object when the transported object is transported to a predetermined location of the branching section, based on a transport speed and an acceleration/deceleration state of the transported object detected by the sensor; and
controls a rotational timing of the transport rollers and of the diverting transport rollers based on a transport speed and an acceleration/deceleration state of the transported object that are predicted.

3. The diverting equipment according to claim 2, wherein:
the control device individually controls a rotational timing of the transport rollers and a rotational timing of the diverting transport rollers.

4. The diverting equipment according to claim 3, wherein:
a plurality of transport rollers arranged in a direction of the transporting route and a lateral direction with respect to the transporting route, respectively, in the branching section are grouped for each predetermined number of transport rollers in the direction of the transporting route to form a plurality of transport roller units; and
the control device controls a rotational timing of the transport rollers for each of the transport roller units.

5. The diverting equipment according to claim 4, wherein:
the control device controls a rotational timing of the transport rollers for each of the transport roller units which the transported object passed.

6. The diverting equipment according to claim 2, wherein:
a plurality of transport rollers arranged in a direction of the transporting route and a lateral direction with respect to the transporting route, respectively, in the branching section are grouped for each predetermined number of transport rollers in the direction of the transporting route to form a plurality of transport roller units; and
the control device controls a rotational timing of the transport rollers for each of the transport roller units.

7. The diverting equipment according to claim 6, wherein:
the control device controls a rotational timing of the transport rollers for each of the transport roller units which the transported object passed.

8. The diverting equipment according to claim 1, wherein:
the control device individually controls a rotational timing of the transport rollers and a rotational timing of the diverting transport rollers.

9. The diverting equipment according to claim 8, wherein:
a plurality of transport rollers arranged in a direction of the transporting route and a lateral direction with respect to the transporting route, respectively, in the branching section are grouped for each predetermined number of transport rollers in the direction of the transporting route to form a plurality of transport roller units; and
the control device controls a rotational timing of the transport rollers for each of the transport roller units.

10. The diverting equipment according to claim 9, wherein:
the control device controls a rotational timing of the transport rollers for each of the transport roller units which the transported object passed.

11. The diverting equipment according to claim 1, wherein:
a plurality of transport rollers arranged in a direction of the transporting route and a lateral direction with respect to the transporting route, respectively, in the branching section are grouped for each predetermined number of transport rollers in the direction of the transporting route to form a plurality of transport roller units; and
the control device controls a rotational timing of the transport rollers for each of the transport roller units.

12. The diverting equipment according to claim 11, wherein:
the control device controls a rotational timing of the transport rollers for each of the transport roller units which the transported object passed.

* * * * *